United States Patent
Kim et al.

(10) Patent No.: US 7,262,883 B2
(45) Date of Patent: Aug. 28, 2007

(54) APPARATUS FOR AND METHOD OF ENHANCING COLOR TEMPERATURE IN COLOR IMAGE

(75) Inventors: Moon-cheol Kim, Gyeonggi-do (KR); Dong-il Song, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 933 days.

(21) Appl. No.: 10/319,844

(22) Filed: Dec. 16, 2002

(65) Prior Publication Data

US 2003/0151754 A1    Aug. 14, 2003

(30) Foreign Application Priority Data

Feb. 6, 2002    (KR) .................................. 2002-6757

(51) Int. Cl.
*H04N 1/46* (2006.01)
(52) U.S. Cl. ......................... 358/1.9; 358/504
(58) Field of Classification Search ................ 358/1.9, 358/2.1, 500, 504, 515–519
See application file for complete search history.

(56) References Cited

U.S. PATENT DOCUMENTS

| | | | |
|---|---|---|---|
| 6,346,968 B1 * | 2/2002 | Dorner et al. ............ | 348/223.1 |
| 6,862,012 B1 | 3/2005 | Funakoshi et al. | |
| 6,947,080 B2 * | 9/2005 | Ikeda ....................... | 348/223.1 |
| 2001/0030278 A1 * | 10/2001 | Koshimizu ............... | 250/208.1 |

FOREIGN PATENT DOCUMENTS

| | | |
|---|---|---|
| JP | 62071393 A * | 4/1987 |
| JP | 4-357790 | 12/1992 |
| JP | 11-18103 | 1/1999 |
| JP | 2001-45513 | 2/2001 |
| JP | 2001-119717 | 4/2001 |

OTHER PUBLICATIONS

Japanese Office Action dated Apr. 25, 2006 issued with respect to Japanese Patent Application No. 2002-375595.
European Search Report issued with respect to Application No. 02024300.2, which corresponds to the above-reference application.

* cited by examiner

*Primary Examiner*—Thomas D. Lee
*Assistant Examiner*—Stephen Brinich
(74) *Attorney, Agent, or Firm*—Staas & Halsey LLP (57) ABSTRACT

A method of enhancing a color temperature of a color image includes calculating gains for input image signals based on a predetermined gain function. A first offset value corresponding to a change in a pedetermined color temperature of output signals is calculated. A second offset value is calculated based on the gains and the first offset value. The second offset value is added to a B signal of the output signals. A compensation gain is calculated in consideration of intensity of the B signal to which the second offset value is added. The compensation gain is added to a G signal. Thus, a desired color temperature can be obtained regardless of the intensities of R, G, and B signals.

41 Claims, 5 Drawing Sheets

FIG. 2D for Y=0.5

FIG. 2A

FIG. 2C for Y=1

APPARATUS FOR AND METHOD OF ENHANCING COLOR TEMPERATURE IN COLOR IMAGE

CROSS-REFERENCE TO RELATED APPLICATIONS

This application claims the benefit of Korean Patent Application No. 2002-6757, filed Feb. 6, 2002, in the Korean Intellectual Property Office, the disclosure of which is incorporated herein by reference.

BACKGROUND OF THE INVENTION

1. Field of the Invention

The present invention relates to an apparatus for and a method of enhancing a color temperature in a color image, and more particularly, to an apparatus for and a method of adaptively enhancing a color temperature in a specific area of an input color image in a digital TV and computer-based image processor so that a viewer can see a clearer and fresher displayed image than an original image.

2. Description of the Related Art

A correlated color temperature (CCT) of white in an image gives a very high visual effect. For example, in a news-type image, a blue color background with a high color temperature can allow a viewer to see the news being broadcast clearer than an image having a background with a low color temperature.

For a similar reason, in a well-known cleaning method, a fluorescent substance which is added to a general synthetic detergent remains in a piece of cloth after cleaning, absorbs ultraviolet energy of sunbeams, and radiates ultraviolet energy in a blue wavelength range in the visual area, thereby highlighting a cleaning degree of the piece of cloth.

By the same token, the color temperature of a white color area in a displayed image is set to be 9300K in a conventional chromaticity diagram of general televisions, higher than a standard color temperature of 6500K of the general televisions so that a user feels less tired and works with the displayed image efficiently for a long period of time.

Accordingly, the standard color temperature of the televisions is set to 10000K in many Asian countries during manufacturing the televisions so as to increase the color temperature of the white color area of the displayed image, thereby simply obtaining the above-described effect. However, in the image obtained by such method, color temperatures of all color areas increase, thereby causing an image quality of some color areas, for example, skin color, to be lowered too much as compared with an original image.

SUMMARY OF THE INVENTION

To solve the above and other problems, it is an aspect of the present invention to provide an apparatus for and a method of selectively enhancing a color temperature in a specific color area of an input color image.

It is another aspect of the present invention to provide an apparatus for and a method of selectively enhancing a color temperature in a specific color area of an input color image and maintaining luminance of all output signals.

It is another aspect of the present invention to provide an apparatus for and a method of selectively enhancing a color temperature in a color image by which a uniform color temperature of a converted image signal can be maintained regardless of an intensity of an image signal.

Additional aspects and advantages of the invention will be set forth in part in the description which follows and, in part, will be obvious from the description, or may be learned by practice of the invention.

Accordingly, to achieve the above and/or other aspects, there is provided a method of enhancing a color temperature of a color image. A gain for input image signals is calculated based on a predetermined gain function. The input image signals are converted to output signals in a predetermined form. A first offset value corresponding to a change in a predetermined color temperature of the output signals is obtained. A second offset value is calculated based on the gain and the first offset value. The second offset value is added to one selected from the output signals converted from the input image signals. A compensation gain is calculated in consideration of a size of the one of the output signals to which the second offset value is added. The compensation gain is added to another one of the output signals except the output signal to which the second offset value is added.

To achieve the above and/or other aspects, there is provided a method of enhancing a color temperature of a color image. A gain for input image signals is calculated based on a predetermined gain function. The input image signals are converted to output signals in a predetermined form. A first offset value corresponding to a change in a predetermined color temperature of the output signals is obtained. A second offset value is calculated based on the gain and the first offset value. A linear gain is calculated from the size of at least one of the output signals. A third offset value is calculated based on a linear gain and the second offset value. The third offset value is added to one of the converted output signals. A compensation gain is calculated in consideration of a size of the one of the output signals to which the third offset value is added. The compensation gain is added to another one of the output signals except the one of the output signals to which the third offset value is added.

To achieve the above and/or other aspects, there is provided an apparatus for enhancing a color temperature of a color image. The apparatus includes a gain calculator, an output signal converter, a first offset value calculator, a second offset value calculator, an offset adder, and a compensation gain calculator. The gain calculator calculates a gain for input image signals based on a predetermined gain function. The output signal converter converts the input image signals to output signals in a predetermined form. The first offset value calculator calculates a first offset value corresponding to a change in a predetermined color temperature of the output signals. The second offset value calculator calculates a second offset value based on the gain and the first offset value. The offset adder adds the second offset to one of the output signals. The compensation gain calculator calculates a compensation gain in consideration of a size of the one of the output signals to which the second offset value is added. Here, the compensation gain is added to another one of the output signals except the one of the output signals to which the second offset value is added.

To achieve the above and/or other aspects, there is provided an apparatus for enhancing a color temperature of a color image. The apparatus includes a gain calculator, an output signal converter, a first offset value calculator, a second offset value calculator, a linear gain calculator, a third offset value calculator, an offset adder, and a compensation gain calculator. The gain calculator calculates a gain for input image signals based on a predetermined gain function. The output signal converter converts the input image signals to output signals in a predetermined form. The first offset value calculator calculates a first offset value corresponding to a change in a predetermined color temperature of the output signals. The second offset value calculator calculates a second offset value based on the gain and the first offset value. The linear gain calculator calculates a linear gain from a size of at least one of the output signals from the output signal converter. The third offset value calculator calculates a third offset value in consideration of the linear gain and the second offset value. The offset adder adds the third offset value to one of the output signals from the output signal converter. The compensation gain calculator calculates a compensation gain in consideration of a size of the one of the output signals to which the third offset value is added. Here, the compensation gain is added to another one of the output signals except the one of the output signals to which the third offset value is added.

BRIEF DESCRIPTION OF THE DRAWINGS

The above and/or other aspects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, embodiments of the present invention will be described in detail with reference to the attached drawings.

Figure 1:
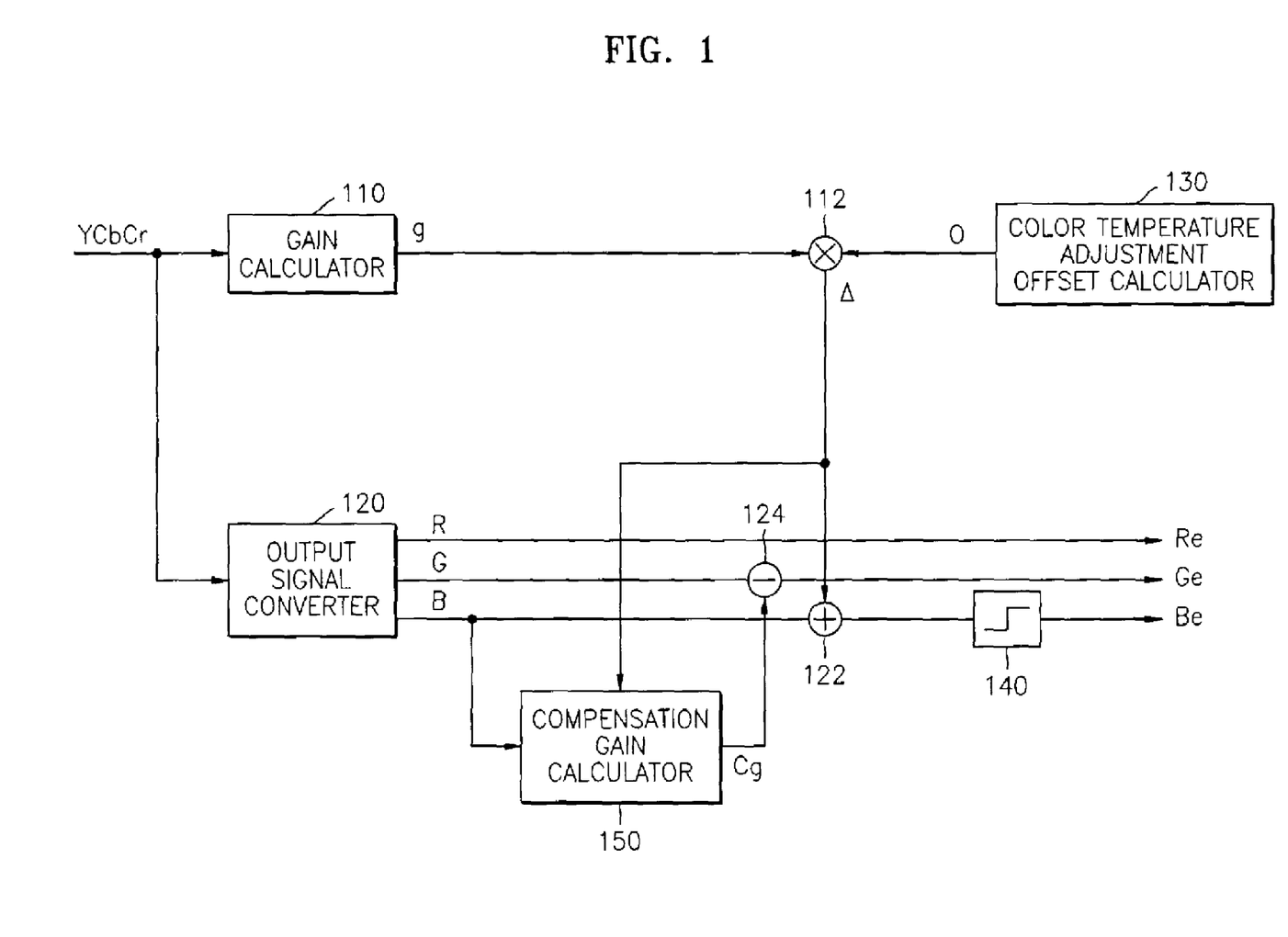
FIG. 1 is a block diagram of an apparatus for enhancing a color temperature according to an embodiment of the present invention.

FIG. 1 is a block diagram of an apparatus for selectively enhancing a color temperature according to an embodiment of the present invention. Referring to FIG. 1, the apparatus includes a gain calculator 110, an output signal converter 120, a color temperature adjustment offset calculator 130, and a compensation gain calculator 140.

The gain calculator 110 receives input image signals Y, Cb, Cr to calculate normalized Y, C, H using equations 1 and 2:

$$C = \sqrt{Cb^2 + Cr^2} \quad (1)$$

$$H = \arctan\left[\frac{Cr}{Cb}\right] \quad (2)$$

Figure 2A:
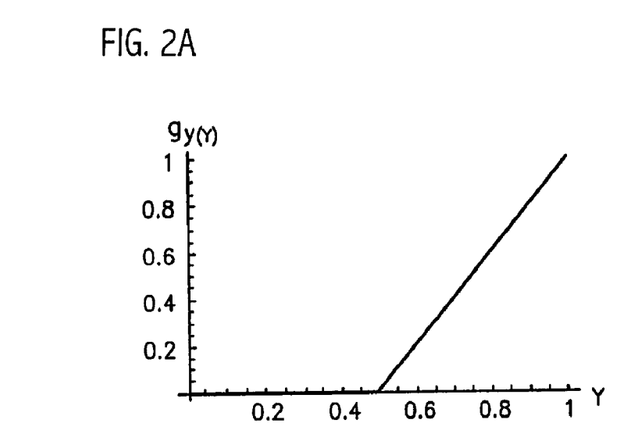
FIGS. 2A-2D are views showing gain functions of the apparatus of FIG. 1.
Figure 2B:
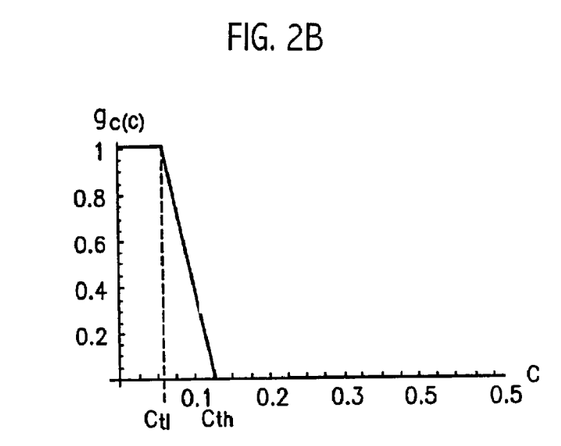

The gain calculator 110 determines a grey color area that will be corrected from the converted signals Y, C, H and obtains gains corresponding to the normalized signals Y, C, H using gain functions shown in FIGS. 2A and 2B. In FIG. 2A, Y varies between 0 and 1, and has a range of {0, 255} for an unsigned 8-bit integer.

Gain functions $g_y(Y)$ and $g_c(C)$ are given by equations 3 and 4:

$$g_y(Y) = (Y - Y_{th})/(1 - Y_{th}) \ (Y > Y_{th})$$

$$g_y(Y) = 0 \ (Y < Y_{th}) \quad (3)$$

$$g_c(C) = 1 \ (C \leq C_{tl})$$

$$g_c(C) = (C_{th} - C)/(C_{th} - C_{tl}) \ (C_{tl} < C < C_{th})$$

$$g_c(C) = 0 \ (C \leq C_{th}) \quad (4)$$

where $Y_{th}$, $C_{th}$, and $C_{tl}$, are random variables. An enhancement color temperature of a specific color area can be controlled by properly setting the variables $Y_{th}$, $C_{th}$, and $C_{tl}$.

In this embodiment, $Y_{th}$ is set to 0.2-0.5 so as not to enhance a color temperature of a white tone of a signal with a low luminance. Also, there are no discontinuous points at a boundary between chroma variables $C_{th}$ and $C_{tl}$ in order to obtain a continuous spectrum of colors.

The gain calculator 110 obtains a gain $g(Y, C) = g_y(Y) \times g_c(C)$ of the input image signals Y, Cb, Cr from the gains $g_y(Y)$ and $g_c(C)$ of the Y and C.

Figure 2C:
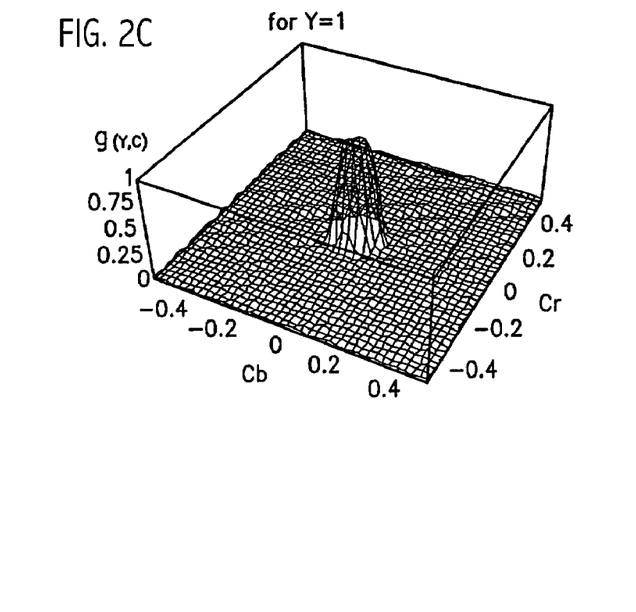
Figure 2D:
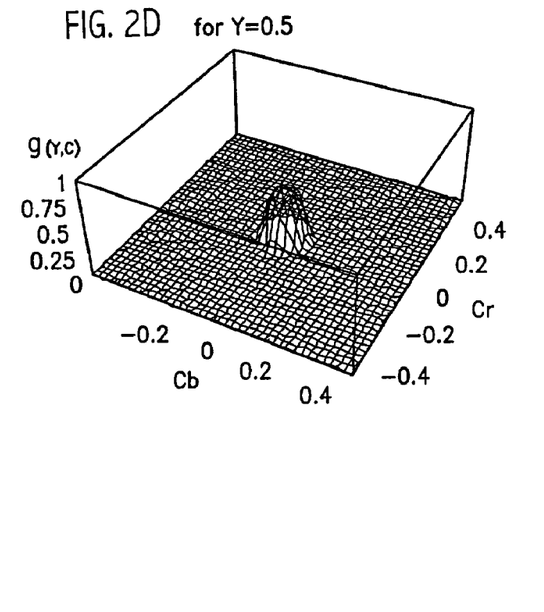

FIG. 2C shows a gain function g(Y, C) when Y is equal to 1, and FIG. 2D shows a gain function g(Y, C) when Y is equal to 0.5.

The output signal converter 120 converts the input image signals Y, Cb, Cr to R, G, B final display drive signals.

The color temperature adjustment offset calculator 130 pre-calculates a first offset value "0" which will be added to the R, G, B signals to change a selected color temperature. In other words, the color temperature adjustment offset calculator 130 pre-obtains changes in the color temperature which are added to the R, G, B signals output from the output signal converter 120 to obtain the Re, Ge, Be output signals.

A multiplier 112 multiples the gain g(Y, C) obtained from the gain calculator 110 by the first offset value "0" obtained from the color temperature adjustment offset calculator 130 to obtain a second offset value Δ for the input image signals Y, Cb, Cr. The gain calculator 110, the color temperature adjustment offset calculator 130, and the multiplier 112 constitute an offset value calculating unit generating the second offset value Δ in response to the input image signals Y, Cb, Cr and modifying at least one of the R, G, and B signals.

The adder 122 adds the second offset value Δ to the B signal of the output signals from the output signal converter 120. Here, if the added signal B+Δ exceeds a maximum value, e.g., 255 when the added signal B+Δ is an 8-bit signal, the added signal B+Δ is clipped by a clipping circuit 140 so as to obtain the maximum value of 255.

Thus, the added signal B+Δ is clipped as the maximum value by the clipping circuit 140 when the output B+Δ from the adder 122 exceeds a limited signal range. Therefore, a desired color temperature may not be obtained when the B signal is within a range of 255-255-Δ.

In order to solve this problem, the compensation gain calculator 150 calculates a color temperature compensation gain Cg using equation 5 and a subtractor 124 subtracts the gain Cg from the G signal from the output signal converter 120.

$$Cg=0 \text{ for } B+\Delta<255$$

$$Cg=m \text{ for } B+\Delta \geq 255 \tag{5}$$

where "m" represents a compensation constant which can be set between 0 and 1. Preferably, the compensation constant "m" is controlled so as to maintain the color temperature and minimize a loss of a luminance.

As described above, the calculated compensation gain Cg is subtracted from the signal G so as to output Re, Ge, Be output signals having desired color temperatures regardless of intensities of the R, G, B signals from the output signal converter 120.

In this embodiment, the color temperature compensation gain Cg is subtracted from the G signal but may be alternatively subtracted from the R signal.

Figure 3:
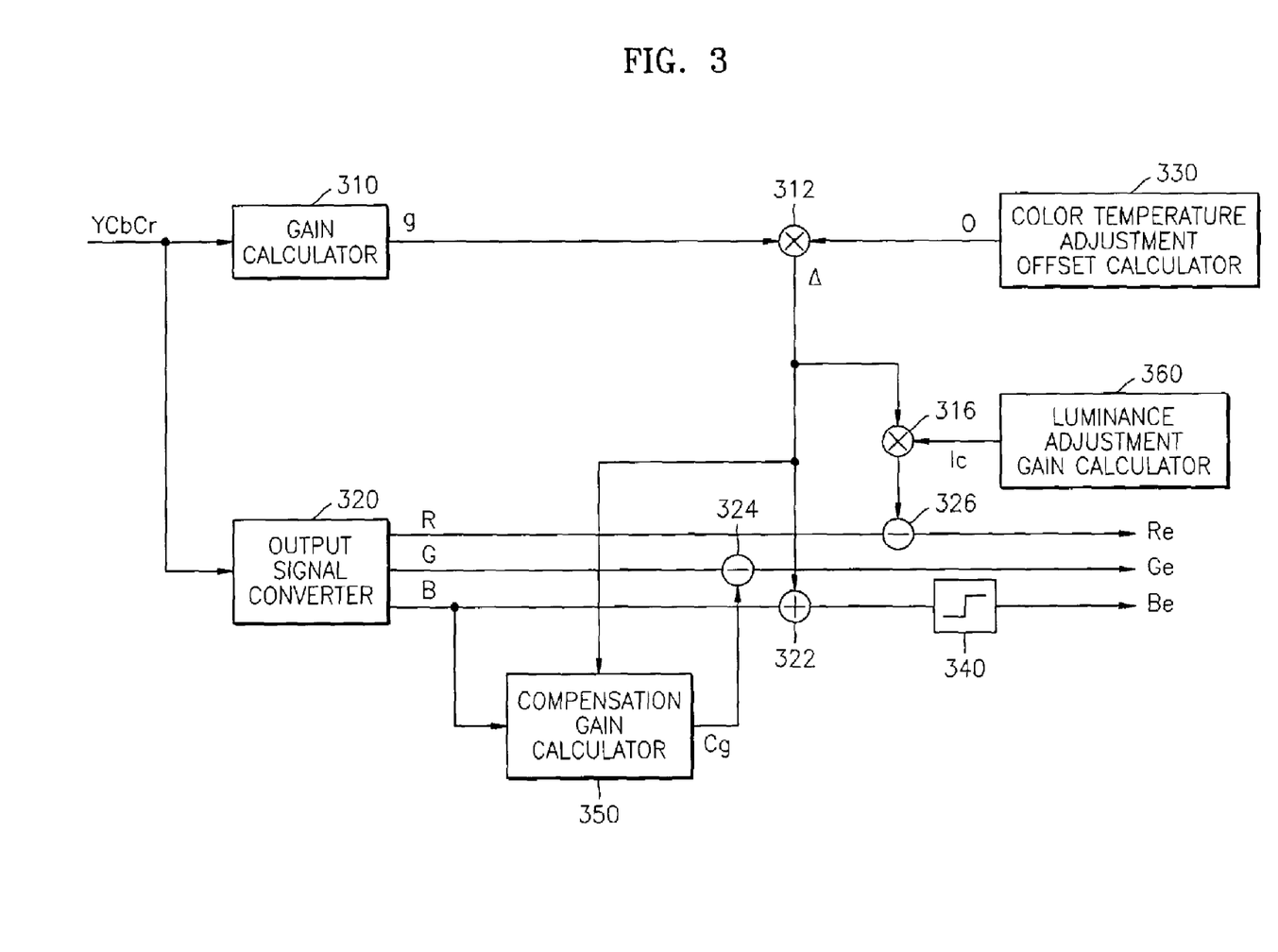
FIG. 3 is a block diagram of an apparatus for enhancing a color temperature according to another embodiment of the present invention.

Another embodiment of the apparatus for enhancing a color temperature will be described with reference to FIG. 3. Here, a gain calculator 310, an output signal converter 320, a color temperature adjustment offset calculator 330, a clipping circuit 340, and a compensation gain calculator 350 perform the same functions as those in the previously described embodiment. Thus, their detailed descriptions are omitted.

A luminance adjustment gain calculator 360 calculates a luminance adjustment gain $I_c$ that is determined by characteristics of channels of a display on which a display image is displayed. A multiplier 316 multiplies the luminance adjustment gain $I_c$ by the second offset value $\Delta$ to obtain a final luminance adjustment gain $I_c \times \Delta$. A subtractor 326 subtracts the final luminance adjustment gain $I_c \times \Delta$ from an R signal. Thus, the luminance of the R signal is decreased by an increase in the luminance of Re, Ge, Be output signals by an addition of the second offset value $\Delta$ to the B signal, so that the luminance of colors represented by the R, G, B signals is identical to the luminance of the Re, Ge, Be output signals.

In this embodiment, the final luminance adjustment gain $I_c \times \Delta$ is subtracted from the R signal but may be alternatively subtracted from the G signal.

The luminance adjustment gain $I_c$ is determined by characteristics of channels, i.e., kinds of fluorescent material and initial settings of the display. In this embodiment, the luminance adjustment gain $I_c$ is determined by a ratio of a luminance value $L_R$ to a luminance value $L_B$ using equation 6. Here, $L_R$ denotes a luminance value when the R, G, B signals are set as (255, 0.0) in an 8-bit signal, and $L_B$ denotes a luminance value when the R, G, B signals are set as (0, 0.255) in an 8-bit signal.

$$I_c=L_R/L_B \tag{6}$$

Figure 4:
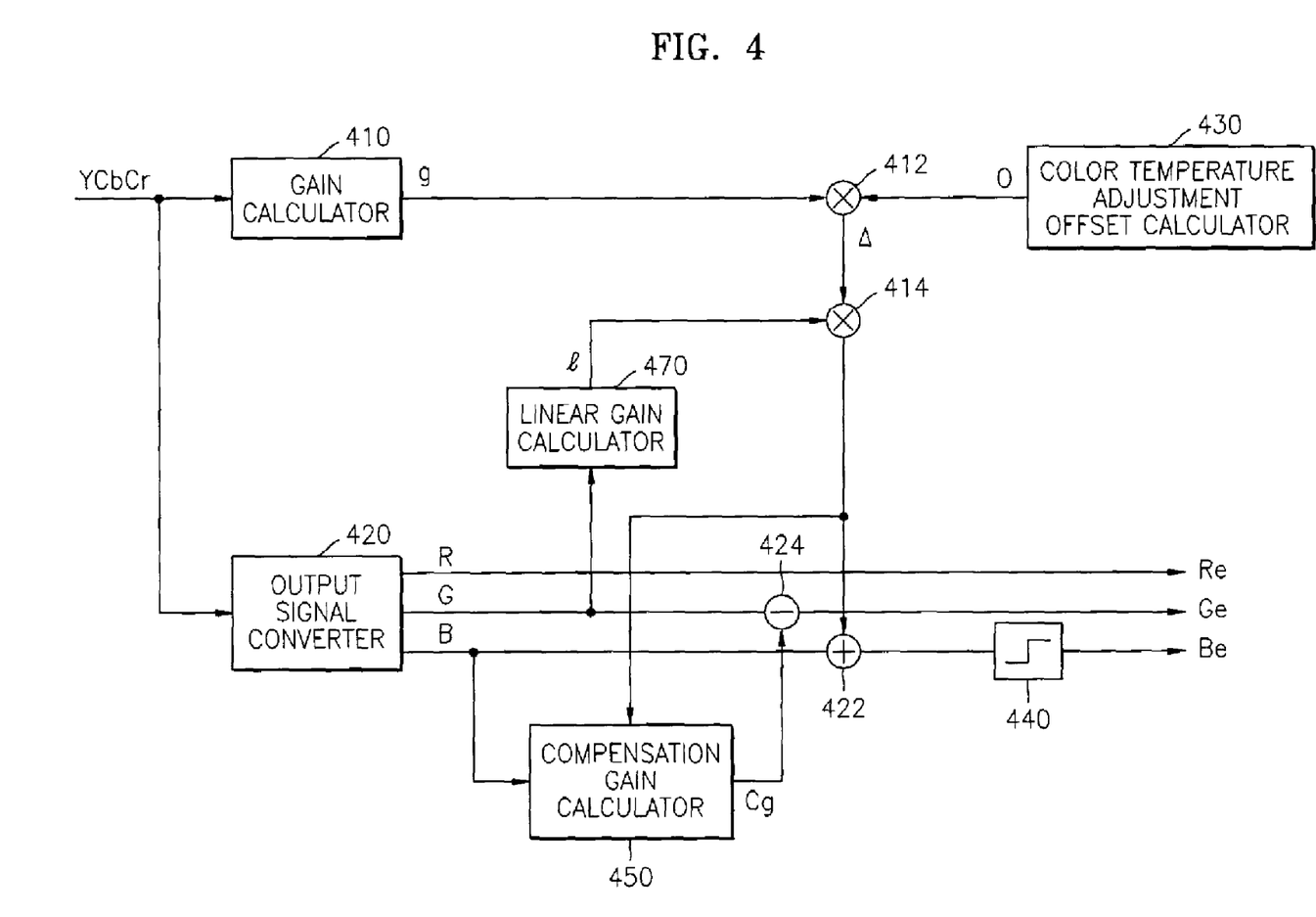
FIG. 4 is a block diagram of an apparatus for enhancing a color temperature according to another embodiment of the present invention.

Still another embodiment of the apparatus for enhancing a color temperature will be described with reference to FIG. 4. Here, a gain calculator 410, an output signal converter 420, a color temperature adjustment offset calculator 430, and a clipping circuit 440 performs the same functions as those in the previously described embodiment. Thus, their detailed descriptions are omitted.

R, G, and B values calculated by the output signal converter 420 are nonlinear signals which were gamma-compensated. Thus, when the constant (second) offset value $\Delta$ is added to one of the R, G, and B signals output from the output signal convert 120 regardless of intensities of the R, G, and B signals, an increase in a color temperature is not proportional to the intensities of the R, G, B signals.

A linear gain calculator 470 calculates a linear gain l so as to maintain constant changes in color temperatures of Re, Ge, and Be output signals regardless of the intensities of the R, G, B signals. The linear gain calculator 470 calculates the linear gain l using equation 7 for a simple configuration of a circuit when the linear gain l is restricted to a grey color area.

$$l = \frac{G}{255} \tag{7}$$

A multiplier 414 multiplies the linear gain l by the second offset value $\Delta$ so as to maintain constant changes in color temperatures of the Re, Ge, Be output signals regardless of the intensities of the R, G, and B signals.

In this embodiment, the linear gain l is calculated based on the G signal, but may be alternatively calculated based on another signal among the R, G, and B signals.

An adder 422 aids a final offset $l*\Delta$ calculated by the multiplier 414 to the B signal output from the output signal converter 420. If the added signal $B+l*\Delta$ exceeds a maximum value (255 in this embodiment), the added signal $B+l*\Delta$ is clipped by the clipping circuit 440 to the maximum value.

Thus, the added signal $B+l*\Delta$ is clipped as the maximum value by the clipping circuit 440 when the added signal $B+l*\Delta$ exceeds a limited signal range. Therefore, a desired color temperature may not be obtained when the B signal is within a range of $255-255-l*\Delta$.

To solve this problem, a compensation gain calculator 450 calculates a color temperature compensation gain Cg using equation 8, and a subtractor 424 subtracts the color temperature compensation gain Cg from the G signal.

$$Cg=0 \ (B+l*\Delta<255)$$

$$Cg=m*(B+l*\Delta-255) \ (B+l*\Delta \geq 255) \tag{8}$$

where "m" represents a compensation constant which can be set between within 0 and 1. Preferably, the compensation constant "m" is set so as to maintain the color temperature and minimize a loss of a luminance.

In this embodiment, the color temperature compensation gain Cg is subtracted from the G signal but may be alternatively subtracted from the R signal.

Figure 5:
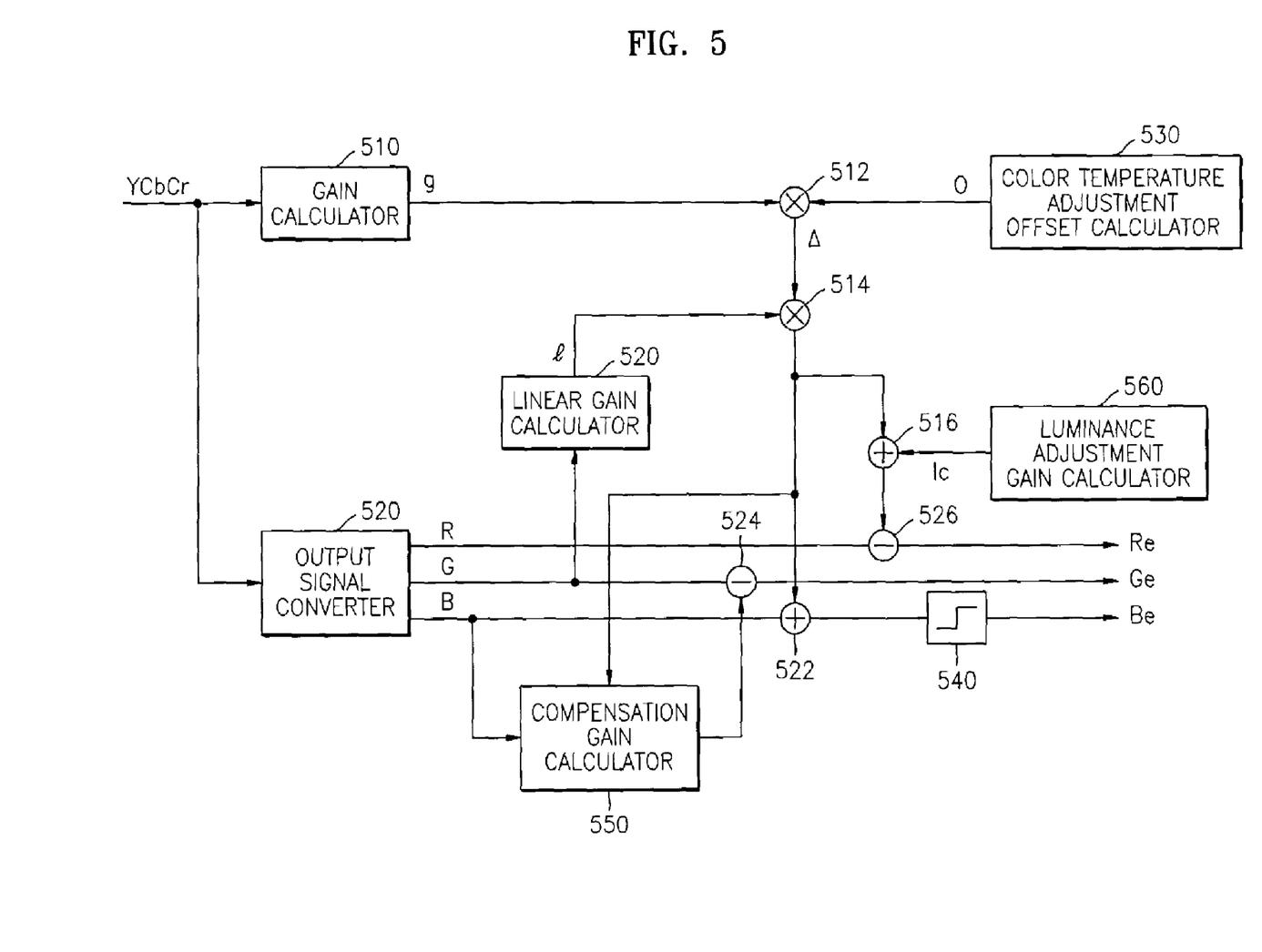
FIG. 5 is a block diagram of an apparatus for enhancing a color temperature according to another embodiment of the present invention.

Still another embodiment of the apparatus for enhancing a color temperature will be described with reference to FIG. 5. Here, a gain calculator 510, an output signal converter 520, a color temperature adjustment offset calculator 530, a clipping circuit 540, a compensation gain calculator 550, and a linear gain calculator 570 perform the same functions as those in the previously described embodiment. Thus, their detailed descriptions are omitted.

A multiplier 514 multiples a linear gain l calculated by the linear gain calculator 570 by the second offset value $\Delta$.

An adder 522 adds a final offset value $l*\Delta$ calculated by the multiplier 514 to the B signal output from the output signal converter 520. If the added signal $B+l*\Delta$ exceeds a maximum value (255 in this embodiment), the added signal $B+l *\Delta$ is clipped to the maximum value by the clipping circuit 540.

The compensation gain calculator 550 calculates a color temperature compensation gain Cg if the added signal $B+l*\Delta$ output from the adder 522 exceeds a limited signal range, e.g., 255, when the added signal B+l*Δ is an 8-bit signal. A subtractor 524 subtracts the compensation gain Cg from the G signal.

The multiplier 514 multiples the final offset value l*Δ calculated by the multiplier 514 by a luminance adjustment gain $I_c$ calculated by a luminance adjustment gain calculator 560. A subtractor 526 subtracts a final luminance adjustment gain $I_c \times l*Δ$ calculated by the multiplier 514 from the R signal. Thus, the luminance of the R signal is decreased by an increase in the luminance of the Re, Ge, Be output signals by the addition of the final offset value l*Δ to the B signal so that the luminance of colors represented by the R, G, and B signals is identical to the luminance of the Re, Ge, Be output signals.

As described above, using the apparatus for enhancing a color temperature according to the present invention, with an enhancement in a color temperature of a specific grey color area, color temperatures of Re, Ge, Be output signals can be adaptively enhanced regardless of the intensities of R, G, and B signals. Also, luminance of input signals and luminance of output signals can be uniformly maintained. Further, a viewer can easily adapt to a white color within an image having relatively higher color temperature than an original image and thus sees a fresher and clearer displayed image than the original image.

Although the invention has been described with reference to the preferred embodiments shown in the drawings, the drawings are for illustration purpose only. The scope of the present invention must not be interpreted as being restricted to the embodiments. Therefore, it will be apparent to one of ordinary skill in the art that modifications of the described embodiments may be made without departing from the spirit and scope of the invention. Consequently, the true technical protective scope of the present invention must be determined based on the technical spirit of the appended claims and equivalents thereof.

What is claimed is:

1. A method of enhancing a color temperature of a color image, the method comprising:
    calculating a gain for input image signals based on a predetermined gain function;
    converting the input image signals to output signals in a predetermined form;
    obtaining a first offset value corresponding to a change in a predetermined color temperature of the output signals;
    calculating a second offset value based on the gain and the first offset value;
    adding the second offset value to one selected from the output signals;
    calculating a compensation gain in consideration of a size of the output signal to which the second offset value is added; and
    adding the compensation gain to another one of the output signals except the output signal to which the second offset value is added.

2. The method of claim 1, wherein the output signals are R, G, and B signals.

3. The method of claim 2, wherein the output signal to which the second offset value is added is a B signal, and another one of the output signals to which the compensation gain is added is a G signal.

4. The method of claim 1, wherein the adding of the second offset value to the one selected from the output signals comprises:
    clipping the output signal to which the second offset value is added if an intensity of the output signal exceeds a maximum value.

5. The method of claim 1, wherein the adding of the second offset value to the one selected from the output signals comprises:
    calculating a luminance adjustment gain based on characteristics of channels of a display on which the color image is displayed.

6. The method of claim 5, wherein the adding of the second offset value to the one selected from the output signals comprises:
    calculating a luminance adjustment offset value based on the luminance adjustment gain and the second offset value; and
    subtracting the luminance adjustment offset value from another one of the output signals except the output signal to which the second offset value is added.

7. The method of claim 6, wherein another output signal from which the luminance adjustment offset value is subtracted is an R signal.

8. A method of enhancing a color temperature of a color image, the method comprising:
    calculating a gain for input image signals based on a predetermined gain function;
    converting the input image signals to output signals in a predetermined form;
    obtaining a first offset value corresponding to a change in a predetermined color temperature of the output signals;
    calculating a second offset value based on the gain and the first offset value;
    calculating a linear gain from a size of at least one of the output signals;
    calculating a third offset value based on the linear gain and the second offset value;
    adding the third offset value to one of the output signals;
    calculating a compensation gain in consideration of a size of the output signal to which the third offset value is added; and
    adding the compensation gain to another one of the output signals except the output signal to which the third offset value is added.

9. The method of claim 8, wherein the output signals are R, G, and B signals, the output signal to which the third offset value is added is the B signal, and another output signal to which the compensation gain is added is the G signal.

10. The method of claim 9, wherein the adding of the third offset value to the one of the output signals comprises:
    calculating a luminance adjustment gain based characteristics of channels of a display on which the color image is displayed.

11. The method of claim 10, wherein the adding of the third offset value to the one of the output signals comprises:
    calculating a luminance adjustment offset value based on the luminance adjustment gain and the third offset value; and
    subtracting the luminance adjustment offset value from another one of the output signals except the output signal to which the third offset value is added.

12. The method of claim 11, wherein another output signal from which the luminance adjustment offset value is subtracted is the R signal.

13. The method of claim 8, wherein the adding of the third offset value to the one of the output signals comprises:

clipping the output signal to which the third offset value is added if an intensity of the output signal exceeds a maximum value.

14. An apparatus for enhancing a color temperature of a color image, the apparatus comprising:
a gain calculator which calculates a gain for input image signals based on a predetermined gain function;
an output signal converter which converts the input image signals to output signals in a predetermined form;
a first offset value calculator which calculates a first offset value corresponding to a change in a predetermined color temperature of the output signals;
a second offset value calculator which calculates a second offset value based on the gain and the first offset value;
an offset adder which adds the second offset value to one of the output signals; and
a compensation gain calculator which calculates a compensation gain in consideration of a size of the output signal to which the second offset value is added,
wherein the compensation gain is added to another one of the output signals except the output signal to which the second offset value is added.

15. The apparatus of claim 14, wherein the output signals from the output signal converter are R, G, B signals.

16. The apparatus of claim 15, wherein the output signal to which the second offset signal is added is the B signal, and another output signal to which the compensation gain is added is the G signal.

17. The apparatus of claim 14, further comprising:
a clipping unit which clips the output signal to which the second offset value is added if an intensity of the output signal exceeds a maximum value.

18. The apparatus of claim 14, further comprising:
a luminance adjustment gain calculator which calculates a luminance adjustment gain based on characteristics of channels of a display on which the color image is displayed.

19. The apparatus of claim 18, further comprising a luminance adjustment offset value calculator which calculates a luminance adjustment offset value based on the luminance adjustment gain and the second offset value, wherein the luminance adjustment offset value is subtracted from another one of the output signals except the output signal to which the second offset value is added.

20. The apparatus of claim 19, wherein another output signal from which the luminance adjustment offset value is subtracted is an R signal.

21. An apparatus for enhancing a color temperature of a color image, the apparatus comprising:
a gain calculator which calculates a gain for input image signals based on a predetermined gain function;
an output signal converter which converts the input image signals to output signals in a predetermined form;
a first offset value calculator which calculates a first offset value corresponding to a change in a predetermined color temperature of the output signals;
a second offset value calculator which calculates a second offset value based on the gain and the first offset value;
a linear gain calculator which calculates a linear gain from a size of at least one of the output signals from the output signal converter;
a third offset value calculator which calculates a third offset value in consideration of the linear gain and the second offset value;
an offset adder which adds the third offset value to one of the output signals from the output signal converter; and
a compensation gain calculator which calculates a compensation gain in consideration of a size of the output signal to which the third offset value is added,
wherein the compensation gain is added to another one of the output signals except the output signal to which the third offset value is added.

22. The apparatus of claim 21, wherein the output signals from the output signal converter are R, G, and B signals, the output signal to which the third offset value is added is the B signal, and another output signal to which the compensation gain is added is the G signal.

23. The apparatus of claim 21, further comprising:
a clipping unit which clips the output signal to which the third offset value is added if the size of the output signal exceeds a maximum value.

24. The apparatus of claim 21, further comprising:
a luminance adjustment gain calculator which calculates a luminance adjustment gain based on characteristics of channels of a display on which the color image is displayed.

25. The apparatus of claim 24, further comprising a luminance adjustment offset value calculator which calculates a luminance adjustment offset value based on the luminance gain and the third offset value, wherein the luminance adjustment offset value is subtracted from another one of the output signals except the output signal to which the third offset value is added.

26. The apparatus of claim 25, wherein another output signal from which the luminance adjustment gain is subtracted is an R signal.

27. An apparatus for enhancing a color temperature of an image to be displayed on a display in accordance with input image signals, the apparatus comprising:
an output signal converter which converts the input image signals to first, second, and third output signals;
an offset value calculating unit generating an offset value according to the input image signals;
an offset adder which adds the offset value to the first output signal; and
a compensation gain calculator which calculates a compensation gain according to the first output signal and the offset value and combines the compensation gain and the second output signal.

28. The apparatus of claim 27, wherein the offset value comprises a first offset value and a second offset value, and the offset value calculating unit comprises:
a gain calculator which calculates a gain from the input image signals based on a predetermined gain function to adjust the color temperature of an area of the image;
a first offset value calculator which calculates the first offset value corresponding to a change in a predetermined color temperature of the output signals; and
a second offset value calculator which calculates the second offset value based on the gain of the gain calculator and the first offset value of the first offset value calculator to output the second offset value as the offset value.

29. The apparatus of claim 28, wherein the second offset value calculator comprises:
a multiplier multiplying the gain by the first offset value.

30. The apparatus of claim 28, wherein the compensation gain calculator calculates the compensation gain according to both the second offset value of the second offset value calculating unit and a size of an intensity of the first output signal.

31. The apparatus of claim 27, wherein the compensation gain calculator comprises:

a subtractor having a negative input receiving the compensation gain and a positive input receiving the second output signal.

32. The apparatus of claim 27, wherein the offset value calculating unit generates a luminance adjustment offset value according to the offset value and characteristics of channels of the display, and the offset value calculating unit comprises:
a subtractor subtracting the luminance adjustment offset value from the third output signal to adjust the third output signal.

33. The apparatus of claim 32, wherein the offset value calculating unit calculates a luminance adjustment gain corresponding to a ratio of a luminance value of the third output signal to a luminance value of the first output signal and generates the luminance adjustment offset value according to the luminance adjustment gain.

34. The apparatus of claim 33, wherein the luminance value of the third output signal is a maximum luminance value of the third output signal when the first and second output signals are a minimum luminance value.

35. The apparatus of claim 33, wherein the luminance value of the first output signal is a maximum luminance value of the first output signal when the second and third output signals are a minimum luminance value.

36. The apparatus of claim 27, wherein the offset value calculating unit comprises:
a luminance adjustment gain calculator which calculates a luminance adjustment gain based on characteristics of channels of the display;
a multiplier multiplying the offset value by the luminance adjustment gain to generate a luminance adjustment offset value; and
a subtractor subtracting the luminance adjustment offset value from the third output signal.

37. The apparatus of claim 27, wherein the offset value calculating unit comprises:
a linear gain calculator generating a linear gain according to the second output signal; and
a second multiplier multiplying the offset value by the linear gain to output a modified offset value to the offset adder and the compensation gain calculator as the offset value.

38. The apparatus of claim 27, wherein the offset value calculating unit comprises:
a luminance adjustment gain calculator which calculates a luminance adjustment gain based on characteristics of channels of the display;
a multiplier multiplying the offset value by the luminance adjustment gain calculator to generate a luminance adjustment offset value
a subtractor subtracting the luminance adjustment offset value from the third output signal to adjust the third output signal;
a linear gain calculator generating a linear gain according to the second output signal; and
a second multiplier multiplying the offset value by the linear gain to output a modified offset value to the offset adder and the compensation gain calculator as the offset value.

39. The apparatus of claim 27, wherein the input image signals are Y, Cb, and Cr signals, respectively, and the first, second, and third output signals are non-linear signals.

40. The apparatus of claim 27, wherein the first, second, and third output signals are gamma-compensated signals.

41. The apparatus of claim 27, wherein the first, second, and third output signals are R, G, and B signals, respectively.

* * * * *

UNITED STATES PATENT AND TRADEMARK OFFICE
CERTIFICATE OF CORRECTION

PATENT NO. : 7,262,883 B2
APPLICATION NO. : 10/319844
DATED : August 28, 2007
INVENTOR(S) : Moon-cheol Kim et al.

Page 1 of 1

It is certified that error appears in the above-identified patent and that said Letters Patent is hereby corrected as shown below:

First Page, Column 2 (Other Publications), Line 4, change "reference" to --referenced--.

First Page, Column 2 (Abstract), Line 4, change "pedetermined" to --predetermined--.

Column 12, Line 16, after "value" insert --;--.

Signed and Sealed this

Twenty-second Day of January, 2008

JON W. DUDAS
*Director of the United States Patent and Trademark Office*